(12) United States Patent
Abe et al.

(10) Patent No.: US 8,378,133 B2
(45) Date of Patent: Feb. 19, 2013

(54) METHOD FOR PRODUCING FATTY ACID ALKYL ESTER

(75) Inventors: Hiroshi Abe, Tokyo (JP); Yasuhiro Ishikura, Wakayama (JP); Rika Honma, Tokyo (JP)

(73) Assignee: Kao Corporation, Tokyo (JP)

( * ) Notice: Subject to any disclaimer, the term of this patent is extended or adjusted under 35 U.S.C. 154(b) by 6 days.

(21) Appl. No.: 13/148,753

(22) PCT Filed: Feb. 10, 2010

(86) PCT No.: PCT/JP2010/000824
§ 371 (c)(1),
(2), (4) Date: Aug. 10, 2011

(87) PCT Pub. No.: WO2010/095397
PCT Pub. Date: Aug. 26, 2010

(65) Prior Publication Data
US 2012/0041220 A1  Feb. 16, 2012

(30) Foreign Application Priority Data

Feb. 17, 2009  (JP) .................................. 2009-033571

(51) Int. Cl.
*C11B 3/00* (2006.01)
(52) U.S. Cl. ....................................... 554/185; 554/187
(58) Field of Classification Search .................. 554/185, 554/187
See application file for complete search history.

(56) References Cited

U.S. PATENT DOCUMENTS

| 5,880,300 | A | 3/1999 | Kodali |
| 5,917,068 | A | 6/1999 | Barnicki et al. |
| 2002/0098536 | A1 | 7/2002 | Norinobu et al. |

FOREIGN PATENT DOCUMENTS

| JP | 7-310090 A | | 11/1995 |
| JP | 2000-502740 A | * | 3/2000 |
| JP | 2000-502740 A | | 3/2000 |
| JP | 2001-509836 A | | 7/2001 |
| JP | 2001-509836 A | * | 7/2001 |
| JP | 2002-233398 A | | 8/2002 |
| JP | 2002233398 A | * | 8/2002 |
| JP | 2002-543008 A | * | 12/2002 |
| JP | 2002-543088 A | | 12/2002 |
| JP | 2008-280252 A | | 11/2008 |
| JP | 2009-13268 A | | 1/2009 |
| WO | WO 00/64921 A2 | | 11/2000 |

OTHER PUBLICATIONS

International Search Report, dated Mar. 9, 2010, for Application No. PCT/JP2010/000824.
Karaosmanoğlu et al., "Investigation of the Refining Step of Biodiesel Production", Energy & Fuels, vol. 10, No. 4, pp. 890-895, 1996.
Moreau et al., "The Identification and Quantification of Steryl Glucosides in Precipitates from Commercial Biodiesel", J. Am. Oil Chem. Soc., vol. 85, pp. 761-770, 2008 (Published online Jul. 3, 2008).
Sjostrom et al., "A Method for the Preparation of Submicron Particles of Sparingly Water-Soluble Drugs by Precipitation in Oil-in-Water Emulsions. II: Influence of the Emulsifier, the Solvent, and the Drug Substance", Journal of Pharmaceutical Sciences, vol. 82, No. 6, pp. 584-589, Jun. 1993.
Tyle et al., "Phytosterol Stabilized Emulsions: Interfacial Complexation and Structural Investigations", Drug Development and Industrial Pharmacy, vol. 16, No. 10, pp. 1605-1618, 1990.
Van Gerpen, "Biodiesel processing and production", Fuel Processing Technology, vol. 86, pp. 1097-1107, 2005.
Van Hoed et al., "Identification and Occurrence of Steryl Glucosides in Palm and Soy Biodiesel", J. Am. Oil Chem. Soc., vol. 85, pp. 701-709, 2008 (Published online Jun. 27, 2008).

* cited by examiner

*Primary Examiner* — Deborah D Carr
(74) *Attorney, Agent, or Firm* — Birch, Stewart, Kolasch & Birch, LLP

(57) ABSTRACT

The present invention provides a method for producing a fatty acid alkyl ester, including step 1 of adding at least one surfactant selected from anionic surfactants, cationic surfactants and amphoteric surfactants and water to a crude fatty acid alkyl ester and stirring to obtain a mixture containing aggregates, and step 2 of separating the aggregates from the mixture from step 1 so that the removal rate of steryl glucoside is 60% or more.

6 Claims, No Drawings

METHOD FOR PRODUCING FATTY ACID ALKYL ESTER

FIELD OF THE INVENTION

The present invention relates to a method for producing a fatty acid alkyl ester.

BACKGROUND OF THE INVENTION

Recently, from the environmental standpoint, fuels that do not increase carbon dioxide have been developed. Among these fuels, lower alkyl esters of fatty acids derived from animal and vegetable fats and oils, particularly from vegetable oils (e.g., fatty acid methyl ester) have come into popular use for a fuel in vehicles and the like. Such a fuel is called "biodiesel," and can be used as is or as a mixed fuel with light oil. The use of biodiesel is rapidly growing.

Fatty acid methyl ester is generally produced by bringing a vegetable oil into contact with methanol in the presence of an acidic catalyst or alkali catalyst at high temperature to esterify the oil, separating layers, and washing with water (Energy & Fuels 1996, 10, 890-895 (ACS Publications), Fuel Processing Technology 2005, 86, 1097-1107 (Elsevier)). The fatty acid methyl ester produced by the conventional method however still contains steryl glucoside which is an impurity originally contained in the raw vegetable oil, even after the step of washing with water. The steryl glucoside is known to cause a serious trouble by depositing as a clog in or around an engine in which the fatty acid methyl ester is introduced (J. Am. Oil. Chem. Soc, 2008, 85, 701-709 (AOCS PRESS), J. Am. Oil. Chem. Soc, 2008, 85, 761-770 (AOCS PRESS)).

For refining a fatty acid alkyl ester, JP-A2008-280252 discloses a method containing thermally oxidizing fatty acid methyl ester, mixing the thermally oxidized fatty acid methyl ester with a nonpolar solvent, leaving the mixture to stand to separate into a lower precipitate and an upper liquid phase, isolating the upper liquid phase, and evaporating the nonpolar solvent from the upper liquid phase.

JP-A07-310090 describes a process of purifying fatty acid methyl ester by adding white clay, while heating, to an oil phase containing fatty acid methyl ester, prepared with given steps, and filtering it to obtain a refined fatty acid methyl ester.

JP-A2009-13268 describes a method for refining a biodiesel fuel such as fatty acid methyl ester, in a method for cleaning a biodiesel fuel by an alkali-catalyzing technique, generating misty water microparticles with a humidifier and allowing to free fall gently in a cleaning tank, and removing alkali ions, glycerol and free fatty acids from the biodiesel fuel while suppressing saponification.

JP-A9-501453 (WO-A95/00609) discloses a method for degumming a fatty substance, bringing the fatty substance into contact with an aqueous solution of a surfactant and/or an emulsifier.

SUMMARY OF THE INVENTION

The present invention relates to a method for producing a fatty acid alkyl ester, including steps 1 and 2:

step 1: adding at least one surfactant selected from anionic surfactants, cationic surfactants and amphoteric surfactants (hereinafter, also referred to as a surfactant) and water to a crude fatty acid alkyl ester produced from an animal or vegetable fat and oil as a raw material to obtain a mixture comprising aggregates; and step 2: separating the aggregates from the mixture obtained in step 1 so that the removal rate of steryl glucoside is 60% or more.

In order to remove steryl glucoside, a fatty acid methyl ester must be purified by distillation. Distillation is, however, energetically and costly unfavorable. Also from a life cycle assessment of fuels, there is a need for developing an alternative technique.

The method of JP-A2008-280252 is a method for restoring the function as a fuel by refining fatty acid methyl ester containing polymers formed by oxidation due to over time and the like to be used as a fuel. The method has insufficient effects for removing steryl glucoside, and is complicated.

Further, in the process of JP-A07-310090, however, in such a separation method, the removal effect of steryl glucoside is not sufficient, an operation of removing white clay becomes required.

In JP-A2009-13268, even with such a method, the removal effect of steryl glucoside is not sufficient. The method is applied only to biodiesel fuels produced using an alkali catalyst.

The present invention relates to a method for producing a fatty acid alkyl ester that enables to effectively remove steryl glucoside contained as a trace impurity in the fatty acid alkyl ester.

fatty acid alkyl ester, or for producing a refined fatty acid alkyl ester. The process of production steps of the present invention is also referred to as refinement, hereinbelow.

According to the present invention, provided is a method for producing a fatty acid alkyl ester that enables to effectively remove steryl glucoside contained as a trace impurity in the fatty acid alkyl ester. The method of the present invention can be performed under energetically and costly gentle conditions, which is industrially advantageous.

In refining a crude fatty acid alkyl ester produced by using an animal or vegetable fat and oil, particularly from a vegetable oil as a raw material, the present invention generates aggregates by conducting a treatment to add a specific surfactant and water to the crude fatty acid alkyl ester as step 1, and separates aggregates containing impurities as step 2. That is, the present invention refines a crude fatty acid alkyl ester, or produces a refined fatty acid alkyl ester, by adding a specific surfactant and water in step 1 to efficiently generate aggregates containing insoluble matters and reducing/removing the aggregates in step 2 by centrifugation, filtration or the like.

<Step 1>

In step 1, at least one surfactant selected from anionic surfactants, cationic surfactants and amphoteric surfactants and water are added to a crude fatty acid alkyl ester produced by using an animal or vegetable fat and oil as a raw material.

A crude fatty acid alkyl ester is produced, for example, industrially by reacting an animal fat and/or a vegetable oil with a lower alcohol, preferably with a lower alcohol having 1 to 5 carbon atoms.

Examples of the vegetable oil include, but not limited to, coconut oil, palm oil, palm kernel oil, palm kernel olein, palm kernel stearin, soy oil, rapeseed oil, corn oil, sunflower seed oil, jatropha oil, algae oil, and the like. Preferably used is at least one vegetable oil selected from coconut oil, palm oil, palm kernel oil, palm kernel olein, rapeseed oil, sunflower seed oil, and soy oil, more preferably selected from coconut oil, palm oil, palm kernel oil, and rapeseed oil. Examples of the animal fat include beef tallow, lard, fish oil, and the like.

Specific examples of the lower alcohol having 1 to 5 carbon atoms include methanol, ethanol, propanol, and the like. From the industrial points of cost and ease of recovering, methanol is preferred.

The starting material, an animal or vegetable fat and oil (raw oil) is reacted with a lower alcohol having 1 to 5 carbon atoms such as methanol in the presence of an acid catalyst and/or an alkaline catalyst to obtain a mixture of a crude fatty acid alkyl ester and glycerol. The mixture is allowed to stand to separate layers. The layer of glycerol is removed. The other layer is washed with water to remove the catalyst and glycerol to obtain a crude fatty acid alkyl ester to be used in step 1. This process is well known industrially and suitable for producing a crude fatty acid alkyl ester used in the present invention such as an ester of a fatty acid having 8 to 22 carbon atoms with an alcohol having 1 to 5 carbon atoms. A crude fatty acid alkyl ester thus produced generally contains steryl glucoside in an amount of 10 to 150 ppm.

Esterification of an animal or vegetable fat and oil can be performed according to known methods. A reaction mode may be a continuous or batch mode. For high-volume production of an ester, a continuous reaction mode is advantageous. As the catalyst, generally used are homogeneous alkaline catalysts such as sodium hydroxide, potassium hydroxide, and sodium alcoholate. Solid catalysts can also be used, including ion-exchange resins, hydrous zirconium oxide, aluminium phosphate, sulfuric acid promoted zirconia, titanosilicate, and the like. In cases of using a homogeneous alkaline catalyst, the reaction is generally performed under the following conditions: a reaction temperature of 30 to 90° C., preferably 40 to 80° C., and a reaction pressure in the range from ambient pressure to 0.5 MPa, preferably at ambient pressure. From the viewpoints of cost and reactivity, an amount of the alcohol used is 1.5 to 10 molar times to glycerides. When glycerides contain a free fatty acid, it is effective that the fatty acid is preliminarily esterified using an acid catalyst such as sulfuric acid and paratoluenesulfonic acid before transesterification using an alkaline catalyst.

Step 1 uses as a surfactant at least one surfactant preferably selected from anionic and amphoteric surfactants, and more preferably selected from amphoteric surfactants.

Examples of the anionic surfactant include alkyl sulfates, alkyl ether sulfates, alkyl ether carboxylates, alkylbenzene sulfonates, and the like. Each alkyl group thereof preferably has 8 to 18 carbon atoms, more preferably 10 to 16 carbon atoms, and even more preferably 12 to 14 carbon atoms. Each ether compound preferably has an average addition mole number of alkylene oxide of 2 to 10. Examples of the alkylene oxide include ethylene oxide and propylene oxide. The anionic surfactant is preferably selected from alkyl sulfates, alkyl ether sulfates, and alkylbenzene sulfonates, more preferably selected from alkyl sulfates and alkylbenzene sulfonates.

Examples of the cationic surfactant include alkyl-(preferably having 8 to 22 carbon atoms, more preferably having 10 to 18 carbon atoms, and even more preferably having 12 to 14 carbon atoms)-trimethylammonium chlorides, alkyl-(preferably having 8 to 22 carbon atoms, more preferably having 10 to 18 carbon atoms, and even more preferably having 12 to 14 carbon atoms)-trimethylammonium bromides, dialkyl-(preferably having 8 to 18 carbon atoms, more preferably having 10 to 16 carbon atoms, and even more preferably having 12 to 14 carbon atoms)-dimethylammonium chlorides, alkyl-(preferably having 8 to 18 carbon atoms, more preferably having 10 to 16 carbon atoms, and even more preferably having 12 to 14 carbon atoms)-benzyldimethylammonium chlorides, and the like. More preferred are alkyltrimethylammonium chlorides as above.

Examples of the amphoteric surfactant include sulfobetaines such as alkyl amide propyl sulfobetaines, alkyl sulfobetaines, and alkyl hydroxy sulfobetaines, carbobetaines such as alkyl amide propyl carbobetaines and alkyl carbobetaines, alkylamine oxides, and the like. The amphoteric surfactant is preferably selected from carbobetaines and sulfobetaines. Each alkyl group thereof preferably has 8 to 18 carbon atoms, more preferably 10 to 16 carbon atoms, and even more preferably has 12 to 14 carbon atoms.

In step 1, the surfactant is preferably added in an effective amount of 0.01 to 10% by weight, more preferably 0.05 to 5% by weight, and even more preferably 0.1 to 1% by weight to a crude fatty acid alkyl ester.

The surfactant may be in the form of liquid or solid. The surfactant may also be used as a mixture with other component. Preferably used is a solution of the surfactant. The surfactant may also be used in the form of dispersion, such as emulsion or suspension, preferably in the form of aqueous dispersion. The surfactant may also be in the form of solid and used as a solid mixture with other solid component. The solid surfactant is preferably used in a powder composition. As a component contained in the solid mixture in a form of solid, table salt, water, alcohol, and the like can be included.

In a solution of the surfactant (hereinafter, also referred to as a surfactant solution, or simply a solution), a content (effective content) of the surfactant is preferably 5% by weight or more, and less than 100% by weight. From the viewpoint of quantity in operation, the content is more preferably 10% by weight or more, more preferably 15% by weight or more, more preferably 20% by weight or more, and even more preferably 25% by weight or more. From the viewpoint of workability in operation, the content is preferably less than 100% by weight, more preferably 80% by weight or less, and even more preferably 65% by weight or less. From the viewpoint of workability in practice, the content is preferably 10 to 80% by weight, more preferably 20 to 65% by weight, and even more preferably 25 to 50% by weight.

As a component to be contained in the surfactant solution, water, methanol, ethanol, isopropanol, acetone, hexane, and the like can be included.

From the viewpoint of workability, preferably used are solutions of the surfactant, more preferably aqueous solutions of the surfactant.

A final amount of the surfactant, and particularly the surfactant solution used may be added all at once or portionwise, continuously or intermittently.

In step 1, water is added to a crude fatty acid alkyl ester to obtain a mixture containing aggregates. The added amount of water is preferably 1 to 1000% by weight to the crude fatty acid alkyl ester. The amount is more preferably 2% by weight or more, more preferably 3% by weight or more, and even more preferably 5% by weight or more. The amount is also more preferably 100% by weight or less, more preferably 50% by weight or less, and even more preferably 20% by weight or less. When an aqueous solution or an aqueous dispersion of the surfactant is used as above, all the water to be added to the crude fatty acid alkyl ester may be water of the aqueous solution or the aqueous dispersion.

In step 1, in cases of using the aqueous solution or aqueous dispersion, water other than that derived from the aqueous solution or aqueous dispersion is preferably further added. When further added, in the total of an amount of water derived from the aqueous solution or aqueous dispersion (W1) and an amount of water further added (W2), a percentage of W2 is preferably 50% by weight or more and less than 100% by weight, and more preferably 70% by weight or more and less than 100% by weight.

The total amount of water to be added (W1+W2) is preferably 1% by weight or more and less than 300% by weight to the crude fatty acid alkyl ester. This is based on that the total amount less than 1% by weight results in a mixture that is physically difficult to be separated in a practical process and the total amount 300% by weight or more results in an emulsion that is difficult to be separated into oil and water.

In step 1, a final amount of water to be used may be added all at once or portionwise, continuously or intermittently.

In step 1, the surfactant and water can be added to a crude fatty acid alkyl ester in any order as long as the effects of the present invention is not impaired. In other words, steps of (1) adding the surfactant and then water; (2) simultaneously adding the surfactant and water through different means of addition, respectively; (3) adding water and then the surfactant; (4) adding an aqueous solution of the surfactant or the like can be employed. They may be employed in combination. In these adding methods, the surfactant or a solution thereof, and water can be added by different means of addition, respectively, (e.g., feeding inlets) to a crude fatty acid alkyl ester. Among these steps, preferred is the step of addition (1), and more preferably the step of addition (1) using a surfactant solution.

In step 1, the surfactant and/or water is preferably added to a crude fatty acid alkyl ester heated to 30 to 90° C., more preferably 50 to 90° C., and preferably with stirring the crude fatty acid alkyl ester.

After the surfactant and water are added, a mixture is preferably stirred and mixed for 5 minutes to 5 hours at 30 to 90° C., more preferably at 40 to 90° C., more preferably at 50 to 90° C., and even more preferably at 50 to 70° C. From the viewpoint of aggregability, a time of stirring and mixing at the specified temperature is preferably 1 minute or more, and more preferably 20 minutes or more. From the viewpoint of economic efficiency, the time of stirring and mixing at the specified temperature is preferably 3 hours or less, and more preferably 1.5 hours or less. From the viewpoint of operability, the time at the specified temperature is preferably 5 to 30 minutes, and more preferably 10 to 30 minutes. A stirring condition at that time is preferably batchwise or continuous.

In step 1, from the viewpoint of operability, water is added to the crude fatty acid alkyl ester after the surfactant or a solution thereof is added and stirred and mixed for 1 minute to 10 hours at 30 to 90° C., more preferably at 40 to 90° C., and even more preferably at 50 to 90° C. In this stage, from the viewpoints of workability and operability, a time of stirring and mixing is preferably 3 minutes or more, and more preferably 5 minutes or more. The time is also preferably 5 hours or less, more preferably 2 hours or less, and even more preferably 1 hour or less. A stirring condition at that time may be batchwise or continuous.

In the present invention, for providing a fatty acid alkyl ester having a removal rate of steryl glucoside of 60% or more, it is preferred that, in step 1, the surfactant or a solution thereof is added to a crude fatty acid alkyl ester (preferably heated to 40 to 90° C., and more preferably 50 to 90° C.) in the effective amount of 0.01 to 10% by weight, and water is, simultaneously or sequentially, added to the crude fatty acid alkyl ester in the amount of 1 to 1000% by weight, and the mixture is kept at 30 to 90° C. for 15 minutes to 10 hours, preferably while stirring.

In step 1, a stirring and mixing system may be conducted in a batchwise way or in a continuous way.

<Step 2>

In step 2, by separating the aggregates from the mixture obtained in step 1, the fatty acid alkyl ester (refined fatty acid alkyl ester) in which a removal rate of steryl glucoside is 60% or more. A removal rate of steryl glucoside is preferably 70% or more, more preferably 80% or more, more preferably 90% or more, and even more preferably 95% or more.

In the present invention, a removal rate of steryl glucoside (%) is determined as follows. A content of steryl glucoside in a vegetable oil (raw oil or refined oil) is measured according to the method described in Examples below.

Removal rate of steryl glucoside (%)=[1−(content of steryl glucoside in a vegetable oil after removal of aggregates)/(content of steryl glucoside in a vegetable oil (raw oil))]×100

In the crude fatty acid alkyl ester after step 1, aggregates containing insoluble matters are generally formed. Steryl glucoside are present in these aggregates. The aggregates are hardly soluble in the crude fatty acid alkyl ester. It is supposed that the specific surfactant selected by the present invention has good properties of dispersing the aggregates in water and makes the aggregates easily distributed in the aqueous phase. Accordingly, in step 2, these aggregates can be removed by a known means for separating a solid-liquid mixture, a liquid-liquid mixture, or the like to obtain a crude fatty acid alkyl ester having a removal rate of steryl glucoside of 60% or more.

Specific examples of the means for separation include centrifugation, decantation, filtration, and a combination thereof. Separation by centrifugation can be performed at 40 to 90° C., and more preferably at 40 to 70° C., under a condition of 1,000 to 100,000 G, and more preferably 5,000 to 50,000 G.

A fatty acid alkyl ester obtained in step 2 (refined fatty acid alkyl ester) preferably has a retention of vitamin E of 80% or more, more preferably 90% or more, and even more preferably 95% or more. Vitamin E is a component expected to function as an antioxidant in storage of the fatty acid methyl ester. A high retention thereof is favorable.

In the present invention, a retention of vitamin E (%) is determined as follows. A content of vitamin E in a vegetable oil (raw oil or refined oil) is measured by the method described in Examples below.

Retention of vitamin E (%)=[(content of vitamin E in a vegetable oil after removal of aggregates)/(content of vitamin E in a vegetable oil (raw oil))]×100

EXAMPLES

The following Examples demonstrate the present invention.

Examples are intended to illustrate the present invention and not to limit the present invention.

Examples 1 to 3 and Comparative Examples 1 to 3

For each Example and Comparative Example, to crude coconut oil as a starting material were added 7 equivalents of methanol and 0.1% by weight (to crude coconut oil) of acid catalyst (sulfuric acid). A mixture was heated to reflux. To this was added 0.5% by weight (to crude coconut oil) of alkaline catalyst (sodium hydroxide). A mixture was heated to reflux to obtain a mixture of a coconut fatty acid methyl ester and glycerol. The mixture was allowed to stand to separate layers. A glycerol layer was separated off. The resultant layer was washed with water to remove catalysts and glycerol. The crude coconut fatty acid methyl ester thus prepared still contained 101 ppm of steryl glucoside. The crude coconut fatty acid methyl ester had a purity of 95%.

In a vertically long 500 cc separable flask as a reaction vessel, 200 g of the crude coconut fatty acid methyl ester was heated to 60° C. while stirring (with a six-bladed mechanical stirrer, each blade was made of stainless and had a diameter of 60 mm, a rotation frequency: 580 rounds/min.). To this was added a surfactant as shown below in an effective amount of 0.4 g. A mixture was stirred at 60° C. for 60 minutes. Then, to this was added 20 g of water and stirred for additional 1 hour at 60° C. The resultant mixture was centrifuged for 10 minutes under conditions of 15,000 G and 60° C. (HITACHI himac CR22F). Water and aggregates were separated by decantation to obtain a refined coconut fatty acid methyl ester.

A content of steryl glucoside in the refined coconut fatty acid methyl ester was measured, and compared with that in the crude coconut fatty acid methyl ester to determine a removal rate. A content of steryl glucoside was measured according to a method described in Lipids, 34 (11), 1231 (1999) (published in American Oil Chemists' Society). Results are shown in Table 1.

Surfactants used were as follows.

Example 1: 30% aqueous solution of dodecyl amide propyl carbobetaine

Example 2: sodium dodecyl sulfate

Example 3: 30% aqueous solution of cetyltrimethylammonium chloride

Comparative Example 1: no surfactant

Comparative Example 2: polyoxyethylene lauryl ether (nonionic surfactant, average addition mole number of ethylene oxide: 8)

Comparative Example 3: diethanol dodecylamine (nonionic surfactant)

TABLE 1

|  |  | Removal rate of sterol glucosides (%) |
|---|---|---|
| Example | 1 | more than 99 |
|  | 2 | more than 99 |
|  | 3 | more than 99 |
| Comparative example | 1 | 54 |
|  | 2 | 41 |
|  | 3 | 38 |

As shown in Table 1, use of at least one surfactant selected from anionic surfactants, cationic surfactants and amphoteric surfactants according to the present invention could efficiently remove steryl glucoside from a fatty acid alkyl ester.

Examples 4 to 7

Fatty acid alkyl esters were prepared from crude palm oil, crude soy oil, crude rapeseed oil, and crude sunflower seed oil and refined similarly as in Example 1. For each fatty acid ester, a removal rate of steryl glucoside was determined similarly as in Example 1. A content of vitamin E before and after refinement of each fatty acid alkyl ester was measured to determine a retention of vitamin E. A content of vitamin E was measured according to Standard Methods for the Analysis of Fats, Oils and Related, 2.4.10-2003 (tocopherol) (Japan Oil Chemists' society eds., 2003). Results are shown in Table 2.

TABLE 2

|  |  | Sterol glucosides in fatty acid methyl ester (ppm) | | Removal rate of sterol glucosides (%) |
|---|---|---|---|---|
|  | Starting oil | Before refinement | After refinement | |
| Example | 4 Crude palm oil | 4 | 0* | more than 99 |
|  | 5 Crude soy oil | 17 | 0* | more than 99 |
|  | 6 Crude rapeseed oil | 3 | 0* | more than 99 |
|  | 7 Crude sunflower oil | 22 | 0* | more than 99 |

*0 ppm refers to an amount lower than the detection limit.

TABLE 3

|  |  | Vitamin E in fatty acid methyl ester* (ppm) | | |
|---|---|---|---|---|
|  | Starting oil | Before refinement | After refinement | Retention of Vitamin E (%) |
| Example | 4 Crude palm oil | 722 | 722 | more than 99 |
|  | 5 Crude soy oil | 1306 | 1300 | more than 99 |
|  | 6 Crude rapeseed oil | 959 | 950 | more than 99 |
|  | 7 Crude sunflower oil | 805 | 801 | more than 99 |

*the amount of vitamin E refers to the total amount of tocophenol and tocotrienol.

From results in Tables 2 and 3, it was shown that the method of the present invention could efficiently remove steryl glucoside (glycosterols) from various fatty acid alkyl esters prepared with different starting oils, and that vitamin E expected to function as an antioxidant in storage of a fatty acid methyl ester can be highly efficiently retained.

The invention claimed is:

1. A method for producing a fatty acid alkyl ester, comprising steps 1 and 2:
   step 1: adding at least one surfactant selected from the group consisting of anionic surfactants, cationic surfactants and amphoteric surfactants and water to a crude fatty acid alkyl ester produced from an animal or vegetable fat and oil as a raw material to obtain a mixture comprising aggregates; and
   step 2: separating the aggregates from the mixture obtained in step 1 so that the removal rate of steryl glucoside in fatty acid alkyl ester is 60% or more.

2. The method for producing a fatty acid alkyl ester according to claim 1, wherein the surfactant is at least one surfactant selected from the group consisting of anionic surfactants selected from the group consisting of alkyl sulfates, alkyl ether sulfates and alkylbenzene sulfonates, and amphoteric surfactants selected from the group consisting of carbobetaines and sulfobetaines.

3. The method for producing a fatty acid alkyl ester according to claim 1, wherein the animal or vegetable fat and oil is at least one vegetable oil selected from the group consisting of coconut oil, palm kernel oil, palm kernel olein, palm kernel stearin, palm oil, rapeseed oil, sunflower seed oil, soy oil, jatropha oil, and algae oil.

4. The method for producing a fatty acid alkyl ester according to claim 1, wherein, in step 1, the surfactant is added to the crude fatty acid alkyl ester, and stirring the mixture for 1 minute to 10 hours at 30 to 90° C., and then adding water to the resultant mixture.

5. The method for producing a fatty acid alkyl ester according to claim 1, wherein, in step 1, the used surfactant is a solution comprising 5% by weight or more and less than 100% by weight of the surfactant as the effective amount.

6. The method for producing a fatty acid alkyl ester according to claim 1, wherein, in step 1, the surfactant is added in the effective amount of 0.01 to 10% by weight to the crude fatty acid alkyl ester.

* * * * *